(12) United States Patent
Crawford et al.

(10) Patent No.: US 11,738,309 B2
(45) Date of Patent: Aug. 29, 2023

(54) EXTRUSION METHOD FOR MAKING A GASEOUS EMISSIONS TREATMENT COMPONENT

(71) Applicant: Advanced Technology Emission Solutions Inc., Toronto (CA)

(72) Inventors: Robin Crawford, Carlisle (CA); John Douglas, Brantford (CA)

(73) Assignee: ADVANCED TECHNOLOGY EMISSION SOLUTIONS INC., Toronto (CA)

( * ) Notice: Subject to any disclaimer, the term of this patent is extended or adjusted under 35 U.S.C. 154(b) by 0 days.

(21) Appl. No.: 17/065,094

(22) Filed: Oct. 7, 2020

(65) Prior Publication Data

US 2021/0046421 A1 Feb. 18, 2021

Related U.S. Application Data

(63) Continuation of application No. 15/972,187, filed on May 6, 2018, now Pat. No. 10,835,864.

(51) Int. Cl.
| | | |
|---|---|---|
| *B01D 53/94* | (2006.01) | |
| *C04B 40/02* | (2006.01) | |
| (Continued) | | |

(52) U.S. Cl.
CPC ............ *B01D 53/94* (2013.01); *B05C 1/00* (2013.01); *B28B 3/269* (2013.01); *B28B 3/2636* (2013.01); *B28B 11/007* (2013.01); *B28B 11/043* (2013.01); *B28B 11/045* (2013.01); *B28B 11/241* (2013.01); *B29C 48/0022* (2019.02); *B29C 48/11* (2019.02); *B29D 99/0089* (2013.01); *C04B 14/10* (2013.01); *C04B 14/42* (2013.01); *C04B 26/02* (2013.01); *C04B 35/195* (2013.01); *C04B 38/0012* (2013.01); *C04B 38/0054* (2013.01); *C04B 40/0218* (2013.01); *C04B 41/009* (2013.01); *C04B 41/5127* (2013.01); *C04B 41/5155* (2013.01); *C04B 41/88* (2013.01); *F01N 3/2013* (2013.01);
(Continued)

(58) Field of Classification Search
CPC ......... Y10T 29/49345; Y10T 29/49604; B28B 3/2645
See application file for complete search history.

(56) References Cited

U.S. PATENT DOCUMENTS

| | | | | | |
|---|---|---|---|---|---|
| 3,146,508 A | * | 9/1964 | Berliner | ................ | B28B 3/2645 425/114 |
| 3,148,431 A | * | 9/1964 | Berliner | ................ | B28B 3/2645 425/114 |

(Continued)

FOREIGN PATENT DOCUMENTS

| | | | | | |
|---|---|---|---|---|---|
| JP | 08252814 A | * | 10/1996 | ........... | B28B 3/2645 |
| KR | 2006037890 A | * | 5/2006 | ........... | B28B 3/2645 |

*Primary Examiner* — Sarang Afzali
(74) *Attorney, Agent, or Firm* — Bhole IP Law; Anil Bhole; Marc Lampert (57) ABSTRACT

In a method of making a gaseous emissions treatment component, a 'green' ceramic mix is extruded through a die to form an extrusion having cells extending along the extrusion, the cells being bounded by walls dividing adjacent cells from one another. In concert with the extruding, metal is fed through the die with the extruded mix. A length of the extrusion and associated metal is then cut off and fired to form the component.

4 Claims, 5 Drawing Sheets

(51) Int. Cl.
- *B28B 11/04* (2006.01)
- *B29D 99/00* (2010.01)
- *C04B 26/02* (2006.01)
- *C04B 38/00* (2006.01)
- *C04B 35/195* (2006.01)
- *C04B 14/10* (2006.01)
- *C04B 14/42* (2006.01)
- *B28B 11/24* (2006.01)
- *B29C 48/11* (2019.01)
- *B29C 48/00* (2019.01)
- *B28B 3/26* (2006.01)
- *C04B 41/51* (2006.01)
- *C04B 41/88* (2006.01)
- *B28B 11/00* (2006.01)
- *H05B 6/10* (2006.01)
- *F01N 3/20* (2006.01)
- *C04B 41/00* (2006.01)
- *B05C 1/00* (2006.01)
- *F01N 3/022* (2006.01)
- *C04B 111/00* (2006.01)
- *B29C 48/345* (2019.01)
- *B05B 7/20* (2006.01)
- *F01N 3/28* (2006.01)
- *B29C 48/30* (2019.01)

(52) U.S. Cl.
CPC .............. *H05B 6/108* (2013.01); *B05B 7/206* (2013.01); *B29C 48/022* (2019.02); *B29C 48/30* (2019.02); *B29C 48/345* (2019.02); *C04B 2111/0081* (2013.01); *F01N 3/0222* (2013.01); *F01N 3/2828* (2013.01); *F01N 2510/02* (2013.01); *Y02T 10/12* (2013.01); *Y10T 29/496* (2015.01); *Y10T 29/49345* (2015.01); *Y10T 29/49604* (2015.01)

(56) References Cited

U.S. PATENT DOCUMENTS 8,080,081 B2 * 12/2011 Bruck .................. F01N 13/008
  55/523
2007/0252310 A1 * 11/2007 Brockway ........... C04B 38/0012
  264/630

* cited by examiner

EXTRUSION METHOD FOR MAKING A GASEOUS EMISSIONS TREATMENT COMPONENT

CROSS REFERENCE TO RELATED PATENTS

The present application is a continuation application of U.S. patent application Ser. No. 15/972,187 filed May 6, 2018, now issued as U.S. Pat. No. 10,835,864, and entitled "Gaseous emissions treatment components and methods for manufacturing thereof".

U.S. patent application Ser. No. 15/972,187, now issued as U.S. Pat. No. 10,835,864, is a continuation-in-part application of U.S. patent application Ser. No. 15/650,416 filed Jul. 14, 2017, now issued as U.S. Pat. No. 10,814,276, and entitled "A catalytic converter component and process for its manufacture", which is a continuation application of U.S. patent application Ser. No. 13/971,247 filed Aug. 20, 2013, entitled "Process for manufacturing a component for a catalytic converter" now issued as U.S. Pat. No. 9,737,851, which claims priority pursuant to 35 U.S.C. § 119(e) to U.S. Provisional Patent Application 61/692,732 entitled "A catalytic converter component and process for its manufacture," filed Aug. 24, 2012, and U.S. Provisional Application 61/733,949, entitled "A catalytic converter component and process for its manufacture," filed Dec. 6, 2012.

U.S. patent application Ser. No. 15/972,187, now issued as U.S. Pat. No. 10,835,864, is also a continuation-in-part application of U.S. patent application Ser. No. 15/259,858 filed Sep. 8, 2016, entitled "Gaseous emissions treatment structures with induction heating" and now issued as U.S. Pat. No. 10,352,214, which is a continuation application of U.S. patent application Ser. No. 14/452,800 filed Aug. 6, 2014 entitled "Catalytic converter structures with induction heating", now issued as U.S. Pat. No. 9,488,085, which claims priority pursuant to 35 U.S.C. § 119(e) from U.S. Provisional Application 61/879,211 entitled "Catalytic converter employing electrohydrodynamic technology" filed Sep. 18, 2013, and U.S. Provisional Patent Application 61/910,067 entitled "Catalytic converter using field heating of metal component" filed Nov. 28, 2013.

FIELD OF THE INVENTION

This invention relates to gaseous emissions treatment components and methods for manufacturing thereof, such components having particular but not exclusive application to catalytic converters, particulate filters (PFs) and like structures for treating exhaust gases to reduce harmful pollution.

BACKGROUND

The U.S. Department of Transportation (DOT) and the U.S. Environmental Protection Agency (EPA) established U.S. federal rules that set national greenhouse gas emission standards. Beginning with 2012 model year vehicles, automobile manufacturers required that fleet-wide greenhouse gas emissions be reduced by approximately five percent every year. Included in the requirements, for example, the new standards decreed that new passenger cars, light-duty trucks, and medium-duty passenger vehicles had to have an estimated combined average emissions level no greater than 250 grams of carbon dioxide ($CO_2$) per mile in vehicle model year 2016.

Catalytic converters and DPFs are used in internal combustion engines to reduce noxious exhaust emissions arising when fuel is burned as part of the combustion cycle. Significant among such emissions are carbon monoxide and nitric oxide. These gases are dangerous to health but can be converted to less noxious gases by oxidation respectively to carbon dioxide and nitrogen/oxygen. Other noxious gaseous emission products, including unburned hydrocarbons, can also be converted either by oxidation or reduction to less noxious forms. The conversion processes can be effected or accelerated if they are performed at high temperature and in the presence of a suitable catalyst being matched to the particular noxious emission gas that is to be processed and converted to a benign gaseous form. For example, typical catalysts for the conversion of carbon monoxide to carbon dioxide are finely divided platinum and palladium, while a typical catalyst for the conversion of nitric oxide to nitrogen and oxygen is finely divided rhodium.

Catalytic converters and PFs have low efficiency when cold, i.e. the running temperature from ambient air start-up temperature to a temperature of the order typically of 300 C or "light-off" temperature, being the temperature where the metal catalyst starts to accelerate the pollutant conversion processes previously described. Light-off is often characterized as the temperature at which a 50% reduction in toxic emissions occurs and for gasoline is approximately 300° C. Below light-off temperature, little to no catalytic action takes place. This is therefore the period during a vehicle's daily use during which most of the vehicle's polluting emissions are produced. Getting the catalytic converter or PF hot as quickly as possible is important to reducing cold start emissions.

Co-pending U.S. patent application Ser. No. 14/452,800 (Catalytic converter structures with induction heating) shows a catalytic converter assembly having a substrate body with a plurality of cells for passage therethrough of exhaust gases. Metal is located at predetermined locations in the substrate body and an electromagnetic field generator is mounted adjacent the substrate body for generating a varying electromagnetic field inductively to heat the metal and so heat the substrate body.

SUMMARY OF THE INVENTION

According to one aspect of the invention, there is provided a method of making a gaseous emissions treatment component, comprising extruding ceramic mix through a die to form an extrusion having a plurality of elongate cells extending along the extrusion, the cells bounded by walls dividing adjacent cells from one another, in concert with the extruding feeding metal through the die with the extruded mix, and cutting off and firing a length of the extrusion and associated metal to form a composite substrate.

The metal can comprise metal wires with the wire being fed through apertures in the die at the sites of said at least some of the cells. Preferably, the apertures closely match the cross-sectional shape and size of the wires. Alternatively, the metal wires are entrained in the walls of the extrusion as the ceramic mix is extruded through the die. In both cases, forward ends of the wires can be fixed to a pull fixture with the pull fixture being pulled to maintain the wires in tension and in desired positions in the extrudate. In a further alternative, the metal can comprise metal particles mixed with the green ceramic mix with the feeding of the metal particles being through apertures in the die at the sites of said at least some of the cells. Preferably, the firing acts to bond the metal particles and ceramic mix to the walls. Preferably, the concentration of the metal particles is made sufficiently high that, upon firing, at least some of the metal particles consolidate as a metal mass.

BRIEF DESCRIPTION OF THE DRAWING

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
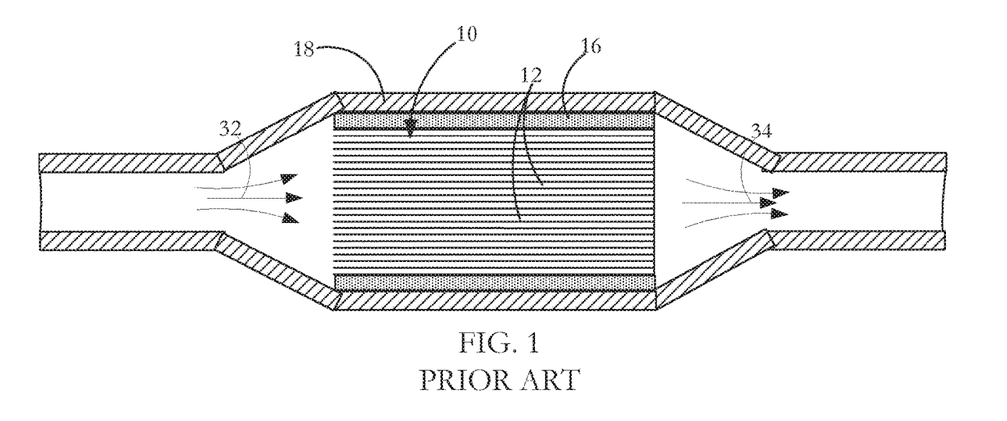
FIG. 1 is a longitudinal sectional view of a prior art gaseous emissions treatment unit.

A gaseous emissions treatment assembly may take any of a number of forms. Typical of these is a catalytic converter having a cylindrical substrate body 10 usually made of ceramic material and often called a brick, an example of which is shown in FIG. 1. The brick has a honeycomb structure in which a number of small area passages or cells 12 extend the length of the brick, the cells being separated by walls 14. There are typically from 400 to 900 cells per square inch (cpsi) of cross-sectional area of the substrate body 10 and the walls are typically in the range 0.003 to 0.008 inches in thickness. Typically, the ceramic substrate body 10 is formed in an extrusion process in which green ceramic material—containing clay or a mix of clay and particulate ceramic—is extruded through an appropriately shaped die and units are cut successively from the extrusion. The units are fired to convert the clay component to ceramic, the units being then cut into bricks. The areal shape of the cells or passages 12 may be whatever is convenient for contributing to the overall strength of the substrate body 10 while presenting a large contact area at which flowing exhaust gases can interact with a hot catalyst coating the interior walls of the cells. In other gaseous emissions treatment such as particulate filters, there may or may not be catalyst coating on the passage walls. In particulate filters, a checkerboard subset of cells have their front ends plugged, a 'reverse' checkerboard subset of cells have their back ends plugged, and gaseous emissions are treated by being driven though porous walls of the honeycomb structure from cells of the first subset into cells of the reverse subset.

In the catalytic converter, interiors of the tubular cells 12 are wash-coated with a layer containing a particular catalyst material. A wash-coat typically contains a base material, suitable for ensuring adherence to the cured ceramic material of the substrate body, and entrained particulate catalyst material for promoting specific pollution-reducing chemical reactions. Examples of such catalyst materials are platinum and palladium which are catalysts effective in converting carbon monoxide and oxygen to carbon dioxide, and rhodium which is a catalyst suitable for converting nitric oxide to nitrogen and oxygen. Other catalysts are known which promote high temperature oxidation or reduction of other gaseous materials. The wash-coating is prepared by generating a suspension of the finely divided catalyst in a ceramic paste or slurry, the ceramic slurry serving to cause the wash-coat layer to adhere to the walls of the ceramic substrate body. As an alternative to wash-coating to place catalyst materials on the substrate body surfaces, the substrate body material itself may contain a catalyst so that the brick presents catalyst material at the internal surfaces bounding the cells.

Exhaust gases from diesel (compression combustion) engines contain more nitrogen oxides than gasoline (spark combustion) engines. Long-term exposure to nitrogen oxides even at low levels can cause temporary or permanent respiratory problems. Selective catalytic reduction (SCR) is a method by which a liquid reductant is injected into a diesel engine exhaust flow to combine with nitrogen dioxide and nitric oxide (referred to collectively as $NO_x$) in the exhaust gas. A preferred reductant is aqueous urea $(2(NH_2)_2CO$ which is often referred to as diesel exhaust fluid (DEF). In the presence of a catalyst, ammonia resulting from thermal decomposition of the urea combines with the nitrogen oxides to produce less harmful products, chiefly nitrogen and water. Other reductants such as anhydrous ammonia and aqueous ammonia may also be used as an alternative to urea although especially for automotive application, on-board storage presents greater difficulty. Suitable catalysts may be any of certain metals oxides (such as those of molybdenum, vanadium, and tungsten), certain precious metals and zeolites. The typical temperature range for a SCR reaction is from 360° C. to 450° C. with a catalyst such as activated carbon being used to stimulate lower temperature reactions. As in gasoline (spark combustion engines), diesel (pressure combustion) engines may experience a period after a start-up where the exhaust temperature is too cool for effective SCR $NO_x$ reduction processes to take place. Other catalytic converters in which the present invention finds application for preheating or supplementary heating are lean NOX catalyst systems, lean NOX trap systems and non-selective catalytic reduction systems. The present invention is applicable also to each of these nitrogen oxide emissions treatment assemblies.

A gaseous emissions treatment assembly may have a series of the substrate bodies or bricks 10, each having a particular catalyst layer or emissions treatment mode depending on the noxious emission to be reduced or neutralized. Gaseous emissions treatment bricks may be made of materials other than fired ceramic, such as stainless steel. Also, they may have different forms of honeycombed cells or passages than those described above. For example, cells can be round, square, hexagonal, triangular or other convenient cross-sectional shape. In addition, if desired for optimizing strength and low thermal capacity or for other purposes, some of the extruded honeycomb walls can be formed so as to be thicker than other of the walls or formed so that there is some variety in the shape and size of cells. Junctions between adjacent interior cell walls can be sharp angled or can present curved profiles.

Typically, as shown in FIG. 1, the wash-coated ceramic honeycomb brick 10 is wrapped in a ceramic fibrous expansion blanket 16. A sheet metal casing or can 18 transitions between the parts of an exhaust pipe (not shown) fore and aft of the gaseous emissions treatment component so as to encompass the blanket wrapped brick. The casing 18 is typically made up of two parts which are welded to seal the brick in place. The expansion blanket 16 provides a buffer between the casing 18 and the brick 10 to accommodate their dissimilar thermal expansion coefficients. The metal of the sheet metal casing 18 expands much more than the ceramic material of the brick at a given temperature increase and, if the two materials were bonded together or in direct contact with each other, destructive stresses would be experienced at the interface of the two materials. The blanket 16 also dampens vibrations from the exhaust system that might otherwise damage the brittle ceramic of the substrate body 10.

In use, the encased brick (or bricks) is mounted in the vehicle exhaust line to receive exhaust gases from the engine and to pass them to the vehicle tail pipe. Exhaust gases 32 enter the front of the gaseous emissions treatment component 10 and treated exhaust gases 34 exit from its rear. In the course of passing along the cells, the exhaust gases the ceramic brick 10 and the catalyst coating is heated to promote treatment processes where the flowing gases contact the catalyst layer. Especially when the vehicle engine is being run at optimal operating temperature and when there is substantial throughput of exhaust gases, such treatment components operate substantially to reduce the presence of noxious gaseous emissions entering the atmosphere. Such components have shortcomings however at start-up when the interior of the brick is at low temperature, during idling during city driving or when waiting for a coffee at a Tim Hortons drive-through, and between electric driving periods for hybrid vehicles.

Brick shape, profile and cell densities vary among different manufacturers. For example, while most bricks are round, some are oval, square or irregular in cross-sectional shape. Some assemblies have single stage bricks that are generally heavily wash-coated with the catalyst metals, while others may have two or three bricks with different wash-coatings on each brick. Some exhausts have 900, 600 and 400 cpsi cell densities used in the full exhaust assembly, while others use only 400 cpsi bricks throughout. A close-coupled converter may be mounted up close to the exhaust manifold with a view to reducing the period between start-up and light-off temperature. An underfloor converter can be located further from the engine where it will take relatively longer to heat up but be relatively larger and used to treat the majority of gases once the exhaust assembly is up to temperature. In another configuration, a component for reducing the period to light-off temperature and a component to deal with high gas flow after light-off are mounted together in a common casing.

At one or more locations in the assembly, sensors mounted in the exhaust gas flow including within or adjacent the substrate body provide feedback to the engine control system for emission checking and tuning purposes. Aside from start-up, control of fuel and air input has the object typically of maintaining a 14.6:1 air:fuel ratio for an optimal combination of power and cleanliness. A ratio higher than this produces a lean condition—not enough fuel. A lower ratio produces a rich condition—too much fuel. The start-up procedure on some vehicles runs rich for an initial few seconds to get heat into the engine and ultimately the catalytic converter. The structures and operating methods described below for indirectly heating the catalyst layers and the exhaust gases can be used with each of a close-coupled catalytic converter, an underfloor converter, and a combination of the two. Outputs from the temperature sensors are taken to a controller at which the monitored temperature or temperatures are used to control when induction heating is switched on and off. Using an appropriate algorithm implemented at the controller, the monitored temperatures may also be used to control specific effects of the applied heating processes to achieve a particular heating pattern.

Figure 2:
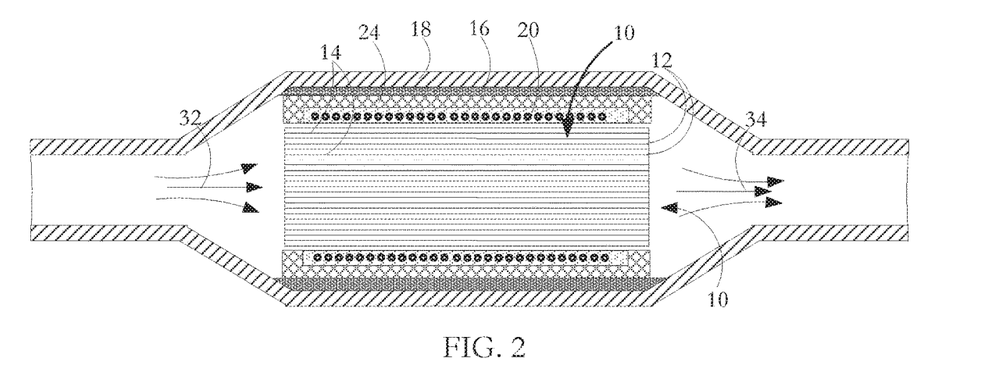
FIG. 2 is a longitudinal sectional view of a gaseous emissions treatment unit adapted for use in an embodiment of the invention.
Figure 3:
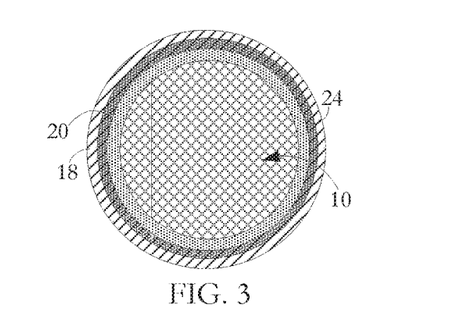
FIG. 3 is a cross-sectional view of the unit of FIG. 2.

As disclosed in U.S. Pat. No. 9,488,085, a gaseous emissions treatment assembly such as that shown in FIG. 1 is modified as shown in FIGS. 2 and 3 to enable induction heating. Induction heating is a process in which a metal body is heated by applying a varying electromagnetic field so as to change the magnetic field to which the metal body is subject. This, in turn, induces eddy currents within the body, thereby causing resistive heating of the body. In the case of a ferromagnetic metal body, heat is also generated by a hysteresis effect. When the non-magnetized ferromagnetic metal is placed into a magnetic field, the metal becomes magnetized with the creation of magnetic domains having opposite poles. The varying field periodically initiates pole reversal in the magnetic domains, the reversals in response to high frequency induction field variation on the order of 1,000s to 1,000,000s cycles per second (Hz) depending on the material, mass, and shape of the ferromagnetic metal body. Magnetic domain polarity is not easily reversed and the resistance to reversal causes further heat generation in the metal.

As illustrated in FIGS. 2 and 3, surrounding the ceramic substrate body 10 is a metal coil 20 and, although not visible in FIG. 2, located within selected ones of the cells 12 are metal inserts 22 (FIG. 4) such as wires. By generating a varying electromagnetic field at the coil 20, a chain reaction is initiated, the end result of which is that after start-up of a vehicle equipped with an exhaust system embodying the invention, light-off temperature may be attained more quickly in the presence of the varying electromagnetic induction field than if there were no such field. The chain reaction is as follows: the varying electromagnetic field induces eddy currents in the metal elements 22; the eddy currents cause heating of the metal elements; heat from the metal elements 22 is transferred to the ceramic substrate body 10; heat from the heated substrate body 10 is transferred to exhaust gas as it passes through the emissions control component; and the heated exhaust gas causes exothermic catalytic reactions to be initiated more quickly at the walls 14 compared to the period to initiation by exhaust gas having only heating from operation of the vehicle engine. Conduction from the heated metal elements 22 is the primary source of heat transfer to the ceramic substrate 10 and therefore to the exhaust gases when the emissions component is in operation. There is also a small amount of convective and radiated heat transfer at any small air gaps between metal elements such as wires and the interior surface of the cells within which they are contained.

The coil 20 is a wound length of copper tube, although other materials such as copper wire or litz wire may be used. Copper tube is preferred because it offers high surface area in terms of other dimensions of the coil; induction being a skin-effect phenomenon, high surface area is of advantage in generating the varying field. If litz wire or copper wire is used, an enamel or other coating on the wire is configured not to burn off during sustained high temperature operation of the converter. An air gap between the coil 20 and the nearest inductance metal elements 22 prevents significant heat transfer from the metal elements 22 to the coil 10 which would otherwise increase the coil resistivity and so lower its efficiency.

A layer 24 of electromagnetic field shielding/concentrating material is located immediately outside the coil 20 to provide induction shielding and to reduce induction loss to the metal converter housing. The layer 24 also acts to increase inductive coupling to the metal in the substrate body 10 to focus heating. The shield/concentrator 24 can be made from a ferrite or other high-permeability, low-power-loss materials such as Giron, MagnetShield, Papershield, Finemet, CobalTex, or other magnetic shielding material that can be arranged to surround some or all of the windings of the coil 20. In particular, the magnetic shield 24 operates as a magnetic flux concentrator, flux intensifier, diverter, or flux controller to contain the magnetic fields within the substrate body. The magnetic shield lowers loss by mitigating undesirable heating of adjacent conductive materials. Without the magnetic shield/concentrator 24, magnetic flux produced by the coil 20 could spread around the coil 20 and link with the electrically conductive surroundings such as the metal casing 18 and other surrounding metal in an exhaust system, and/or other components of an internal combustion engine, vehicle, generator or other electrical system or host system, decreasing the life of these components and increasing energy loss. In addition, the layer 24 operates to direct or concentrate the magnetic field to the substrate body 10 providing selective or enhanced heating of a desired region of the substrate body 10, for example, by redirecting magnetic flux that would otherwise travel away from that desired region. In particular, the layer 24 operates to concentrate the magnetic flux produced by the coil 20 in the direction of the metal elements 22 in the substrate body 10 for more efficient heating. As an additional benefit, the magnetic shield can improve the electrical efficiency of the induction coil 20 by increasing power transfer.

The coil is contained in a fiber insulation sheath 26 with the sheathed coil being encased in a in cast, cured insulation. The sheath functions both to stabilize the coil position and to create an air-tight seal to confine passage of the exhaust gases through the ceramic honeycomb substrate body 10 where catalytic action takes place. The insulation also provides a barrier to prevent the induction coil 20 from shorting on the converter can 18 or the ferrite shield 24. The insulation is suitably alumino-silicate mastic. Alternatively, the substrate body can be wrapped in an alumino-silicate fiber paper. In one manufacturing method, the copper coil 20 is wrapped around the substrate body and then placed in the casing or can 18. In an alternative manufacturing method, the coil 20 is placed in the can or casing 18 and the substrate body 10 is inserted into the coil/can assembly.

A varying electromagnetic induction field is generated at the coil by applying power from either a DC or AC source. Conventional automobiles have 12 VDC electrical systems. The induction system can operate on either DC or AC power supply. The induction signal produced can also be either DC or AC driven. For either DC or AC, this produces a frequency of 1 to 200 kHz, a RMS voltage of 130 to 200V and amperage of 5 to 8 A using 1 kw of power as an example. In one example suitable for road vehicles, a DC to DC bus converts the vehicle's 12 VDC battery power to the required DC voltage outlined above. In another example suitable for conventional road vehicles, a DC to AC inverter converts the vehicle's 12V DC battery power to the desired AC voltage outlined above. Another example is more suited to hybrid vehicles having both internal combustion engines and electric motors have on-board batteries rated in the order of 360V voltage and 50 kW power. In this case, the battery supply power is higher, but the same basic DC to DC bus or DC to AC inverter electrical configuration can be applied. An insulated gate bipolar transistor (IGBT) or metal-oxide-semiconductor field effect transistor (MOSFET) high speed switch is used to change the direction of electrical flow through the coil. In terms of the effect of a varying electromagnetic induction field on metal in the ceramic substrate body, a low switching frequency produces a longer waveform providing good field penetration below the surface of the metal element and therefore relatively uniform heating. However, this is at the sacrifice of high temperature and rapid heating owing to the lack of switching. In contrast, a high switching frequency produces a shorter waveform, which generates higher surface temperature at the sacrifice of penetration depth. Applied power is limited to avoid the risk of melting the metal elements or having them reach Curie point. A suitable power input to a single brick coil is of the order of 1.1 kw, although more than 10 kW is possible.

Figure 4:
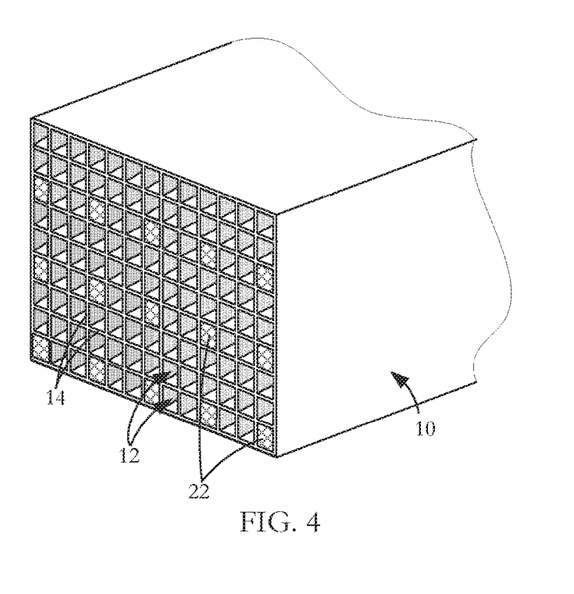
FIG. 4 is a perspective sectional view of a part of a gaseous emissions treatment unit according to an embodiment of the invention showing metal inserts located in cells of a substrate body.

As previously described, metal inserts 22 made of ferromagnetic or other metal are located at selected locations of the ceramic substrate body 10 as shown in the detail view of FIG. 4.

Field produced by the electromagnetic induction coil can be tuned to the metal load to achieve high efficiency in terms of generating heat and reduced time to light-off temperature. Heating effects can be modified by appropriate selection of any or all of (a) the electrical input waveform to the coil 20, (b) nature and position of passive flux control elements such as the shield/concentrator 24, and (c) nature, position, and configuration of the coil 20. In addition, the applied field can be changed with time so that there is interdependence between the induction field/heating pattern and the particular operational phase; for example, pre-start-up, warm-up, highway driving, idling and for hybrids, intermittent change over from internal combustion to electric drive. In an alternative configuration, more than one coil can be used to obtain desired induction effects.

The heating pattern can be determined by appropriate location and configuration of the metal inserts 22. A suitable metal for the inserted metal elements is a ferromagnetic metal such as stainless steel grade 430 which has high magnetic permeability and corrosion resistance. Lower permeability alloys such as 300 or 400 series stainless steels may also be used. Alternative metals can be used depending on particular properties required. For shaping the direction and strength of magnetic flux in the substrate, lower magnetic permeability metals or alloys may be used for the metal elements in the outer cells with relatively higher magnetic permeability metals being used for metal inserts in the inner cells. Metals having very high magnetic permeability may also be used. For example, Kanthal iron-chrome-aluminum alloy stock manufactured by Sandvik has a relative permeability of 9000 and greater. High relative permeability can be achieved using stock made of other alloys including nickel-iron and iron-cobalt alloys.

With cells per square inch (cpsi) in the ceramic substrates being from 400 to 900 and higher, the cross sectional area of cells that are, in the course of production, to receive metal inserts is very small. U.S. patent application Ser. No. 15/486, 369 discloses methods for inserting metal elements such as wires into selected cells of a ceramic substrate.

Figure 5:
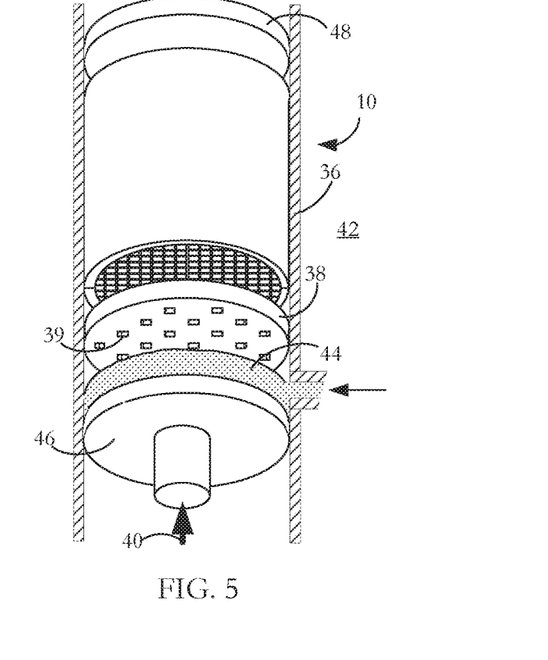
FIG. 5 is a detail view of part of apparatus being used in a method for injecting molten metal into cells of a ceramic substrate according to one embodiment of the invention for use in making a component for a gaseous emissions treatment system.

Referring to FIG. 5, in an alternative method for inserting metal, molten metal is injected into selected cells 22 of the ceramic substrate 10. In preparation for manufacture, ceramic substrate 10 is loaded into a support fixture at an injection station 42 having a chamber 36. A masking gasket 38 is fixed to one end of the substrate 10 to cover the ends of cells 12 which are to remain empty and to expose the ends of cells 12 into which metal is to be injected. A conveyance subsystem, which may, for example, be any one of a suction, positive displacement and auger drive, conveys the molten metal from a crucible furnace along a high pressure line 40 to the injection station 42. At the injection station, a metered charge 44 of the molten metal is injected into the chamber 36 above a ram 46 and the ram is moved upwardly to drive the metal through the apertures in the masking gasket 38 and along the selected cells 12. Injection orientation is not significant. A top plate 48 is configured to allow the escape of air but prevents metal from exiting from the other ends of the cells 12. The masking gasket 38 and top plate 48 are made of a metal with higher melting temperature than that of the metal being injected; for example, steel fixtures may be used for aluminum injection. The substrate 10, gasket 38 and plate 48 are clamped together prior to injection to avoid leakage of molten metal into non-selected cells 12. Flow of the molten metal is manipulated so as to mitigate back pressure build-up caused as solidification starts and which might otherwise cause changes in the rheology of the molten metal, making injection more difficult. Adverse changes in rheology may result in breakage of the ceramic and/or freeze-off of the metal charge 44 when only partially injected. A pressure of from 100 psi to 300 psi and rapid metal injection effected in a fraction of a second are needed to avoid premature freezing of the molten metal before it reaches its desired location. A 4-inch diameter ceramic substrate with 400 cpsi can typically withstand an axial compressive force of 10 MPa (1450 psi), and a radial compressive force of 2 MPa (290 psi). This is in contrast with an injection pressure greater than 1000 psi for typical commercial metal die-casting.

Placement of the masking gasket 38 is effected just prior to metal injection via a vision system and robotic manipulation. The vision system identifies the current position and orientation of the substrate and the associated deviation from a prescribed orientation for proper injection. The deviation is converted to a robotic motion to manipulate either or both of the masking gasket 38 and the substrate 10 before clamping and injection. In conventional, high pressure injection of molten metal parts, the die/mold is of a clam shell form that is rapidly opened and closed for quick feed rates with the dies being cooled for rapid solidification. Such dies are also normally heavily constructed to withstand high hydraulic pressures. For injecting the ceramic substrate 10, the die/mold is the substrate itself and there is no cooling to control temperature or the ability to materially increase the mass of the ceramic. In most implementations, cells immediately adjacent a cell into which metal is injected are empty so the only structural support is the surrounding ceramic walls. Pressures acting against the delicate cell walls 14 must be kept below a level at which they would be damaged. However, although thin-walled, the nature of the honeycomb ceramic and the injection pattern contribute to survivability of the substrate during injection. Thus, a single, large solid part takes a relatively long time to cool because the surface area to volume ratio is typically from 1:1 to 10:1. In contrast, the surface area to volume ratio of a 4 inch diameter ceramic substrate with 400 cpsi, and one cell in 25 occupied by metal is of the order of 100:1. This means that injected molten metal cools almost instantly upon injection because of the low metal mass and the high surface area of ceramic which allows heat to be rapidly conducted from the molten metal into the ceramic. When a ram pushes molten metal into a conventional mold, hydraulic pressure is normally exerted equally in all directions on the mold surface. With the injection into the ceramic substrate cells, the ram pressure quickly changes from hydraulic to axially directed pressure as the metal solidifies. Consequently, the walls of a cell 12 into which molten metal is injected are not significantly stressed and the risk of blowing a wall out is minimized. Resistance to compression, which is the strongest in the axial direction orientation of the ceramic substrate 10, is increased by the addition of the solid metal inserts produced by the injection. Injections into a cold substrate are generally over the full length of the injected cells, because it is difficult effectively to control partial injection in view of the required high injection speed. Following injection, the parts separate with a relatively clean edge. In the case for example of aluminum injection with steel tooling, separation is straightforward because aluminum does not stick to steel even when molten. Ram injection is designed to evacuate all the molten metal in the chamber which means that the only metal left in the system is in the cells of the ceramic and the through-holes in the masking gasket. This residual metal in the gasket layer is a very small amount of material and is partially or wholly consumed as the injected metal shrinks during solidification. In another embodiment, the ram plate has small protrusions that interface with the through holes in the masking gasket 38. At the end of the injection stroke, the ram plate touches the masking gasket and the protrusions project into the through holes to purge them of residual metal. The fixtures can be coated between cycles with a die release lubricant.

In a modified process, the ceramic substrate is pre-heated close to, but below, the melting temperature of the molten metal. Having the ceramic heated affords more time before solidification of injected metal occurs. This means that injection or dosing of the metal is effected more slowly, under greater control and at a preferred relatively lower injection pressure from 25 psi and 200 psi. Using a heated substrate also minimizes thermal shock experienced by the metal and the ceramic and so limits stress resulting from cooling. Mechanical bonding between the metal and the substrate cell walls is also generally improved compared with cold injection. Injection into a pre-heated substrate also reduces the effect of metal shrinkage occurring upon solidification because the heated ceramic is larger than at room temperature and so shrinks as it cools. Although there will be some separation because the ceramic shrinks less than the contained metal, pre-heating of the ceramic reduces the shrinkage difference. Actually, some shrinkage differential is desirable, because, at high temperature reached when a component is operating to treat hot exhaust gas, the separation provides a buffer between the metal and the ceramic. The buffer is also valuable when, in operation, the component is inductively heated because the metal heats up relatively quickly before the ceramic has started to expand. Rapid cooling that characterizes injection into a cold substrate can cause the perimeter of a metal plug to freeze off quickly resulting in metal shrinkage being predominantly in the middle of the metal. This can lead to defects such as cracks and voids. With a pre-heated ceramic substrate, slow cooling results, thereby allowing the perimeter and middle to cool together, to shrink at a much closer rate, and so limit defect formation. As will be described presently, the interior surfaces of the cells 12 are not perfectly smooth and the molten metal conforms somewhat to these surfaces as it solidifies, so providing some level of mechanical retention of the solidified metal elements 22.

Figure 6:
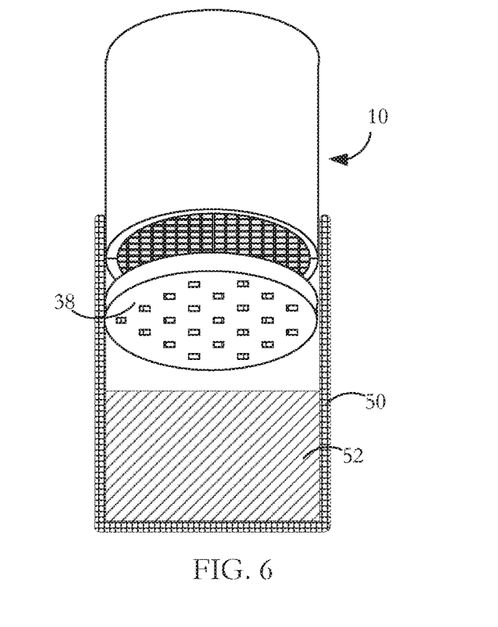
FIG. 6 is a detail view of part of apparatus being used in an alternative method for injecting molten metal into cells of a ceramic substrate according to one embodiment of the invention for use in making a component for a gaseous emissions treatment system.
Figure 7:
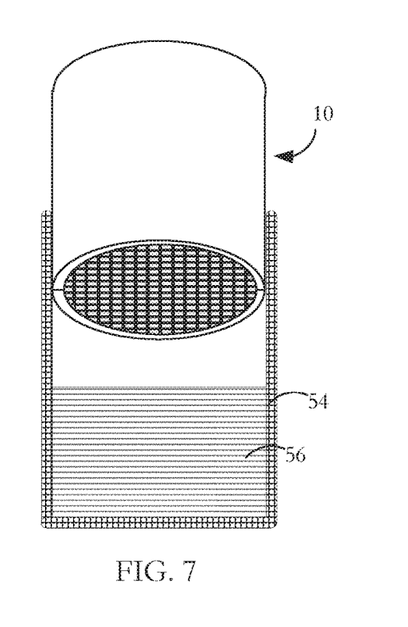
FIG. 7 is a detail view of part of apparatus being used to apply a catalyst layer to cell walls of the ceramic substrate of FIG. 6.

In an alternative process, as illustrated in FIG. 6, a masking gasket 38 is applied to the ceramic substrate 10 which is then submerged in a bath 50 containing molten metal 52 and lowered to a level at which pressure acting on the surface of the contained metal 52 coupled with surface tension forces causes the molten metal to enter from the bottom of the cells and to rise to a level in the substrate corresponding to the desired length of metal insert. Low surface tension and low viscosity are desirable to have liquid rise in a cell. However, the surface tension of molten metal is high, (about 0.9 Newtons/meter for aluminum at 600° C.), as is its viscosity, (about $3 \times 10^{-3}$ Pa-s for aluminum at 600° C.). Consequently, a vacuum suctioning system may be used to draw the molten metal through the substrate channels. Vacuum suctioning parameters may be adjusted to place induction heating metal in contact with the cell walls only where desired; for example, limited to one end region of the substrate. The whole substrate can have metal in contact or just select passages using a gasket or masking technique. For full filling, molten metal is drawn all the way along a channel using high and sustained vacuum. For partially filling, metal is drawn to a desired distance from the face of the substrate by applying and maintaining a lesser vacuum. As indicated previously, selected passages can be fully (blocked) or partially (lined) filled. For blocking, the vacuum is maintained for an extended period of time sufficient for solidification. Coating the channels requires the release of the vacuum after a certain interval to allow excess molten metal to drain from the cell. The interval is proportional to the desired thickness of the coating with a shorter interval producing a relatively thin coating and a longer interval producing a relatively thick coating. Thus a combination of depth of submersion and level of applied vacuum is used to control the amount of filling in the channels. Reversing the vacuum and injecting air is also implemented if necessary to purge molten metal from the channels and leave only the coating encompassing a through hole in the channel. Following application and solidification of the induction heating metal, as shown in FIG. 7, the substrate 10 is submerged in a bath 54 of a catalyst-containing wash-coat 56 which is applied to the walls of the empty cells and to the selected cells if they are not fully blocked by induction heating metal. Resulting adhesion forces between the bare ceramic and the inductive heating metal are high. The sequence of induction metal coating and catalyst wash coating can be reversed without any significant effect on performance and integrity.

Figures 8, 9, 10, 11:
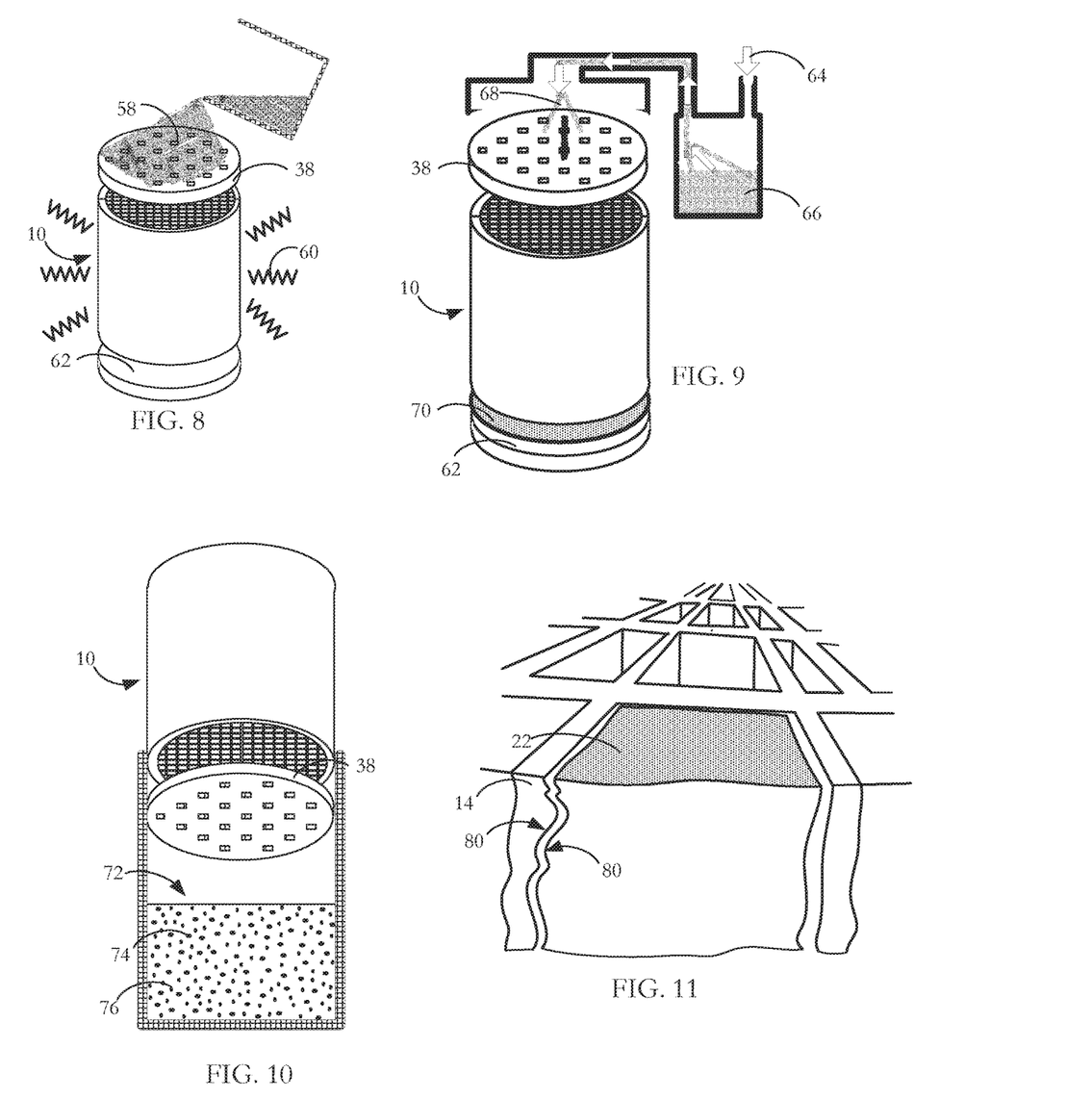
FIG. 8 is a detail view of part of apparatus being used in a method for placing metal particles into cells of a ceramic substrate according to one embodiment of the invention for use in making a component for a gaseous emissions treatment system.
FIG. 9 is a detail view of part of apparatus being used in an alternative method for placing metal particles into cells of a ceramic substrate using fluidized flow according to one embodiment of the invention for use in making a component for a gaseous emissions treatment system.
FIG. 10 is a detail view of part of apparatus being used in a method for placing metal particles into cells of a ceramic substrate, the metal being initially contained in a slurry, the method according to one embodiment of the invention for use in making a component for a gaseous emissions treatment system.
FIG. 11 is a detail view of part of apparatus being used to establish metal placed inside cells of a ceramic substrate a spacing between the outside surface of the metal and the inside surface of the cells, the method according to one embodiment of the invention for use in making a component for a gaseous emissions treatment system.

In another method as illustrated in FIG. 8, metal particles 58 are injected or pumped into selected cells 12 and the substrate 10 is vibrated 60 at high frequency to cause the particles 58 to fall under gravity and to settle against a bottom plate temporarily placed under the substrate 10 to block the ends of the selected cells. The particles 58 are then heated to the melting or softening point of the metal. Heating to the melting point renders the particles into a fully molten mass. An additional amount of metal particles must be added to compensate for reduction in volume caused by collapse of interstitial voids if the cell is to be filled throughout its length. As in direct molten metal injection, the subsequently melted metal generally conforms to the profile of the inside surfaces of the cell walls resulting in some mechanical retention to keep the inserted metal in place. Melting only to the softening point promotes surface melting or wetting but heating is not sufficient to fully melt the particles 58. Consequently, the particles substantially retain their original volume and shape while being physically and electrically linked like a solid. The matrix volume is retained but with a weight lower than a solid metal plug of the same size. As the particles 58 collect in a cell 12, vibration amplitude of the collected particle decreases and the aggregate density of the accumulated particles increases. The vibration filling process works only with gravity; that is, the particles collect and build upwardly from the bottom end of the selected cells. In a variation, vibration to fluidize particle flow to the substrate and into the cells is attained directly by applying an oscillating electric field to the particles. One effect of filling from a fluidize flow is that the accumulations of fluidized particles tend to self-level.

In a variation for cell filling as shown in FIG. 9, air is used to fluidize metal particles to facilitate filling of the cells. High pressure air 64 is injected into a vessel 66 holding the metal particles 68. The pressurized air drives the metal particles down though small holes 39 in a masking gasket 38. The holes 39 register with the ends of cells 12 to be filled with metal powder with other parts of the gasket covering the ends of cells 12 that are to remain empty. The air 64 acts to float and separate the metal particles 68 to establish flow where it would otherwise be very difficult. Escape of air through the holes 39 permits more air to be injected which keeps the metal powder 68 fluid as well as maintaining an air path through the selected cells. Gradually, the selected cells fill with the metal particles 68 with the air continuing to escape via voids between the particles. The pressure of air pushes the particles down into the selected cells as more metal enters the cells and packs particles already in place against a bottom support plate 62. A fine mesh screen 70 that has openings sized smaller than the smallest particle size allows the air to exit the system but retains all the particles within the selected cells. Air fluidized particles flow with the air path which means that the selected cells 12 can be filled from either the top or bottom. Filling from the bottom using an upward flow of air may be supplemented either by lowering the substrate into the fluidized particles or raising the fluidized bed up beyond the bottom of the substrate. Once the selected cells are filled with powder to a desired level, the metal powder is heated to melt or soften it as previously described. In an alternative to the use of metal particles, a length of wire is placed at a desired position in a cell using for example one of the methods described U.S. patent application Ser. No. 15/486,369 and then heated to the melting or softening point of the metal.

Referring to FIG. 10, in another method for placing induction heating metal into selected cells, a 'green' slurry 72 containing particles 76 of ceramic (alumina) and particles 74 of an induction heating metal is coated onto the walls 14 of selected cells 12 or onto the walls of all cells of the substrate 10. The induction heating metal 74 may be of fine particle size on the same order of the size of particles of catalyst metals or may be larger in size provided they are materially smaller than the cell span so that blockage by a particle is avoided. The slurry 72 is prepared by combining water, alumina, powdered metal (either induction metal or a mix of induction metal and catalyst metal) and an optional binder and the substrate is lowered into the slurry to coat the selected cells. The amount of liquid in the mix (mainly water) is varied to achieve a viscosity low enough that it flows into the cells 12 but high enough to leave a coating with a measurable thickness. Vacuum assistance may be used to encourage flow of the slurry into the cells 12, the vacuuming also serving to distribute the coating and to keep cell centers clear to avoid blockage owing to surface tension effects. In one process variation, the slurry forms a coating layer on the inside of a cell. If catalyst metal is mixed with the induction metal or is applied as an overlayer after the induction heating layer is applied, the catalyst metal promotes gaseous emissions treatment within the particular cell when the component is use in exhaust gas treatment. Induction heating metal particles and catalyst metal particles may be mixed and applied together in a single slurry or they may be mixed and applied in separate slurries. Metal layering of all cells by induction heating metal means that, when the component is operated in the course of gaseous emissions treatment, some level of inductive heating takes place at every cell. In this case, the inductive metal heating layer resides just below the surface of the catalyst layer resulting, in operation, in only a short time being needed to heat the catalyst washcoat to the actuation or light-off temperature. In a further variation, the induction heating metal completely or substantially blocks selected cells. To achieve substantial blockage, layers of slurry are successively applied until the cell is closed or the substrate is partially or fully submerged in the slurry. In both cases, sufficient time is allotted for capillary action to draw moisture out of the slurry and so leave a cake or plug within the cell. Secondary curing is used to stabilize the plug. In each of the slurry process variations, the green slurry coating or plug is fired after placement in order to chemically and mechanically bond the induction heating metal layer to the substrate. The substrates are previously fully-fired, so only the applied metal need be cured. The substrates are heated to a temperature below the firing temperature for the substrates and above the maximum in-use application temperature, typically between 800 and 1200° C. While, metal slurry processes are slower than molten metal injection, stress on the substrate is usually lower.

Referring to the detail view of FIG. 11, a characteristic of a plug or layer of metal that undergoes a molten to solid transition within a cell is that the surface of the solidified metal conforms somewhat to the surrounding ceramic walls as shown by the tracked surface shape at 80. Because the wall surfaces are not totally smooth and regular, the molten to solid transition provides some degree of retention of the metal plug or layer in the cell. Texturing or roughness in the ceramic surface, whether present as an artefact of normal extrusion or deliberately applied though imposed extrusion conditions and equipment, provides a measure of mechanical lock at pores and overhangs in the ceramic surface although the metal surface geometry does not conform absolutely to the ceramic surface geometry because metal has a high surface tension and the ceramic is fairly non-wetting. Surface texturing also increases the surface area of a cell and increases the amount of heat conduction between the metal and the ceramic wall compared with perfectly smooth and regular metal and ceramic wall interfaces. Depending on the nature of the ceramic and the metal, there may also be some chemical reaction between the two materials if the temperatures are close to or above the ceramic sintering temperature or there is a reactive species in the metal alloy that makes a new material at the interface.

However, the metal typically has a coefficient of thermal expansion several times that of the ceramic which means that a tight interface can cause damaging stresses in the course of operational temperature cycling. To combat this to the extent possible, the molten metal/ceramic combination is put together a high temperature and then cooled. In this case, the metal contracts considerably more than the surrounding ceramic but with a residual imprint of the ceramic surface at the metal surface over at least part of the metal surface.

In one example, a combination of a cordierite substrate and injected aluminum was used. Cordierite has a coefficient of thermal expansion of about $2\times10^{-6}/°$ C. and aluminum has a coefficient of thermal expansion of about $24\times10^{-6}/°$ C. This means that aluminum has 12× the expansion of cordierite over a given temperature range. When heated from room temperature to 950° C., the peak temperature of a gasoline application, cordierite expanded 0.0019 inches per inch length of material and aluminum expanded 0.0228 inches per inch length of material. Consequently, the expanded difference in length at 950° C. was 0.0209 inches per inch length. For the 0.031 inch diameter (span) square pin used, the difference was 0.00065 inches (0.0209 inches per inch of length×0.031 inches=0.00065). To attain low operational stress at 950° C. coupled with highest possible conformance for retention purposes between the outer surface of the metal and the inner surface of the cell walls, process conditions were selected to achieve a 0.000325 inches gap between the metal and the cell walls at room temperature in order for there to be no gap but maximum surface retention at the 950° C. application temperature. Ideally, for subsequent operational purposes, a gap of uniform spacing exists over the complete metal ceramic interface, this being more readily achieved if the cooling of the ceramic metal combination during manufacture is also uniform. For example, if in a radial sense there is a variation in cooling rate in the metal a shrinkage gap may open up other than at the metal ceramic interface. Also, for ideal operational purposes, it is preferable that heating of the ceramic metal combination whether by the passage of exhaust gas or by induction heating should also be uniform so that the buffer gap between the ceramic and metal uniformly closes as the vehicular application increases to its operating temperature. As indicated, wall surface roughness or texturing can provide retention of close positioned metal. In one production method, the cells that are to accommodate induction heating metal in the finished product are during extrusion deliberately configured to provide non-smooth wall surfaces to accentuate retention.

Figure 12:
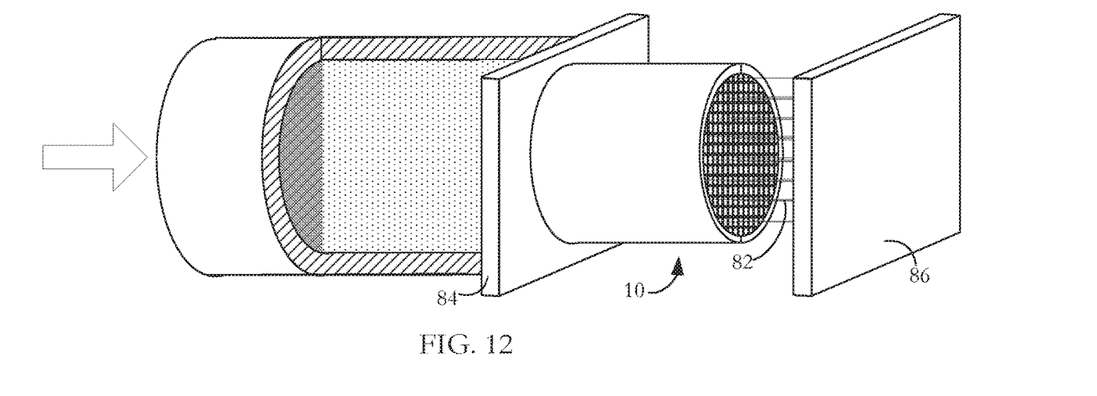
FIG. 12 is a detail view of part of apparatus being used in a method for pulling wires through a die in concert with extruding clay or clay/ceramic mix through the die to produce an extrusion containing the wires, the method according to one embodiment of the invention for use in making a component for a gaseous emissions treatment system.

Referring to FIG. 12, in another method for placing metal in the ceramic substrate, metal in solid form such as wires 82 are pulled through an extrusion die 84 at the time of extruding clay or clay/ceramic mix through the die to produce a green extrusion to be dried and fired and cut into lengths to form the ceramic honeycomb bricks. If, during the extrusion, the wires are entrained within cell walls, the method connotes a low cpsi compared to current commercial high cpsi honeycomb substrates because the thin walls of high cpsi substrates offer little room for accommodation of metal wire. In a variation, a die is modified to so that the wire is pulled along a honeycomb cell site so as effectively to fill the cell as the cell is formed. Die apertures for the wires have tight tolerance relative to the wire gauge to ensure that the wire does not move from side to side and to prevent the clay or clay/ceramic mix from exiting through the apertures. In both cases, leading ends of the wires are attached to a pull plate which is used to advance the wires at the same rate as the extrudate. The pull plate in combination with drag from the die is also used to tension the wires so as to hold them on line and equally spaced from neighbouring wires, lateral displacement of the wires being prevented to avoid damage to adjacent cell walls.

Normally, cutting a clay mix extrudate is effected using a thin cutting wire. The inclusion of induction heating wire in the extrudate makes cutting to length difficult. Whether the extrudate is cut into billets before or after firing, the cutting process is slow. If cutting is effected before firing, care must be taken to avoid damage of the composite structure by unwanted vibration of the induction heating wire from its locations in the relatively soft green cell walls. If the extrudate is cut after firing, cutting remains somewhat difficult. Ceramics are typically cut with a diamond blade while metals are typically cut with a ceramic blade. A combination blade that contains both diamond and ceramic is required to cut through the wire without damaging the ceramic. In an alternative co-extrusion process, finite lengths of wire are pre-cut and pulled through the extruder. Extrusion is complete when the set of short wires for a particular substrate have been pulled completely through the die. The wires are released from the other end resulting in a green, honeycomb billet ready for cutting by a wire saw at a cross sectional plane not occupied by induction heating wire. After cutting, the billet is dried and fired.

Figure 13:
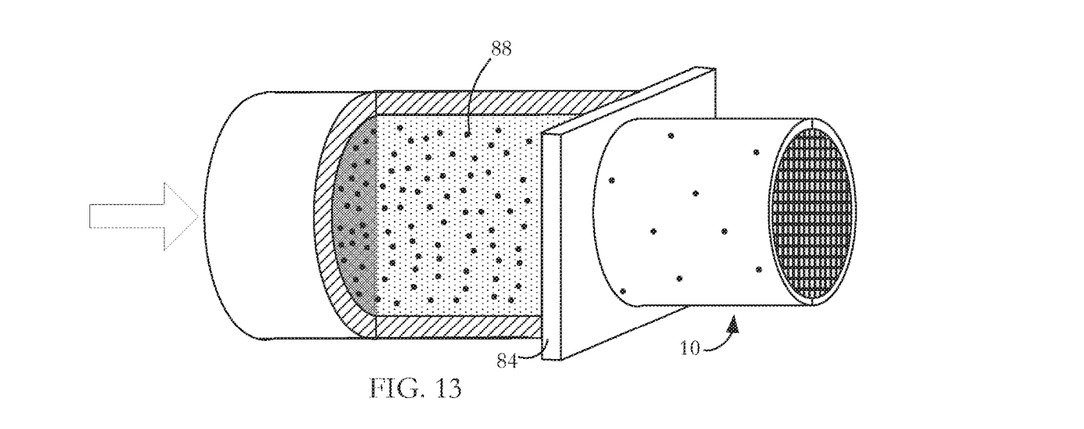
FIG. 13 is a detail view of part of apparatus being used in a method for co-extruding particulate metal and clay or clay/ceramic mix through the die to produce an extrusion containing the particulate metal, the method according to an embodiment of the invention for use in making a component for a gaseous emissions treatment system.

Referring to FIG. 13, in another method for placing solid metal in a ceramic substrate 10, metal powder and green ceramic material—typically clay or a particulate ceramic/clay mix—is formed into a paste 88. In the manufacture of the ceramic substrate, the paste is extruded through a die 84 to produce a composite ceramic/clay metal honeycomb. Either or both of the metal powder content and its distribution are selected to make the substrate inductively active to enable operational induction heating. The metal content is on the order of high-10s to low-100s of grams for a typical 4 inch diameter by 6 inch long 400 cpsi substrate. Actual metal content depends on how much power the catalytic converter or PDF is to absorb when the component is in use. Many applications demand quick heating or high power which require a relatively high metal content. The concentration of metal can be varied along the length of the substrate and/or across its span. The density of metal is several times that of the clay or ceramic ingredients in the mix. Water is added to or removed from the ingredients depending on the powdered metal content and its particle size. Metal typically has a lower affinity for water than clay/ceramic materials so less water is required for the same particle size. More water is required if the particle size of the powdered metal is smaller than that of the powdered clay materials. Water content and particle size are adjusted to produce a desired rheology; for example, to match current commercially used substrate extrusion processes. The metal/clay extrudate is then dried and fired. The metal is chosen to be stable at the ceramic firing temperature and is therefore a spectator material residing in the ceramic matrix without reacting with the ceramic to form radically new products. In composition, the matrix is sintered ceramic with trapped individual metal particles. It is beneficial, although not critical, that the metal content consolidates as a result of firing to produce electrical continuity in all or part of the metal. The metal typically has a thermal expansion several times that of the ceramic meaning that the substrate itself expands more than current commercially used substrates that are devoid of metal. In one form of emissions treatment assembly, to allow a greater dimensional change, a thicker insulation mat is positioned between the ceramic/metal substrate and a surrounding sheet metal canister.

In another process embodiment, streams of (a) a metal powder-green ceramic slurry and (b) a green ceramic mix are co-extruded through a die so that the green ceramic mix forms walls of the honeycomb and the metal-green ceramic slurry eventually forms induction heating elements sited adjacent certain of the honeycomb walls. The metal powder and green ceramic slurry is pumped into and through the die during extrusion of the main green clay/ceramic component. A slurry is necessary because honeycomb dies used for high cpsi extrusions are so intricate that it is difficult successfully to co-extrude two high viscosity materials. The low viscosity metal-ceramic is pumped into the die at locations such that it coats walls of the clay/ceramic cells with a thin layer of inductive metal-ceramic as the walls are extruded. The thickness of the layer is not as critical as the concentration of metal in the layer. For example, a solid 0.031 inches span wire in a 1 in 9 pattern for a 600 cpsi ceramic substrate is equivalent for induction heating purposes to coating all 9 cells in the array for the same ceramic substrate with a metal layer 0.0009 inches thick (or a layer 0.0018 inches for a layer made from a 50:50 slurry made from metal and non-metallic carrier).

In another method of manufacturing a ceramic substrate, a clay or clay/ceramic mix and/or extrusion method is used which results after firing in a ceramic honeycomb substrate with wall surfaces having significant imperfections such as surface pores. An induction heating metal is used having a melting point below the firing temperature for the substrate and above a maximum temperature likely to be experienced in the intended emissions treatment application. At the low end of the range, the typical maximum temperature of an emissions treatment system is around 950° C. for gasoline powered engines and around 700° C. for diesel engines. On the high end of the range, the firing temperature for a cordierite ceramic, for example, is typically around 1300° C. and the firing temperature for a silicon carbide ceramic is typically around 2200° C. The choice of induction heating metal depends on many factors, but a major one is that the minimum service temperature is dictated by the maximum application temperature and the maximum service temperature is dictated by the minimum ceramic firing temperature, with some buffer factored in between those limits. The finished and fired ceramic substrate is submerged into a bath of the molten metal with the ceramic substrate being optionally pre-heated to avoid freeze-off of the molten metal as the substrate is being submerged. Coating of part of a cell length is attained by dipping one end of the substrate or other select regions of cells. Compressed air or vacuum is used to evacuate excess molten metal from the cells. Molten metal is absorbed into the pores of the ceramic and retained upon cooling. The absorption of metal is dependent on the porosity of the ceramic with more porous ceramics absorbing more metal. Metal is also retained on the surface of the ceramic and is linked to metal in pores extending below the surface of the substrate walls. Multiple coats may be required to produce a desired thickness. The process produces metal that appears to be a coating, but in fact has good penetration depth.

Figures 14A, 14B:
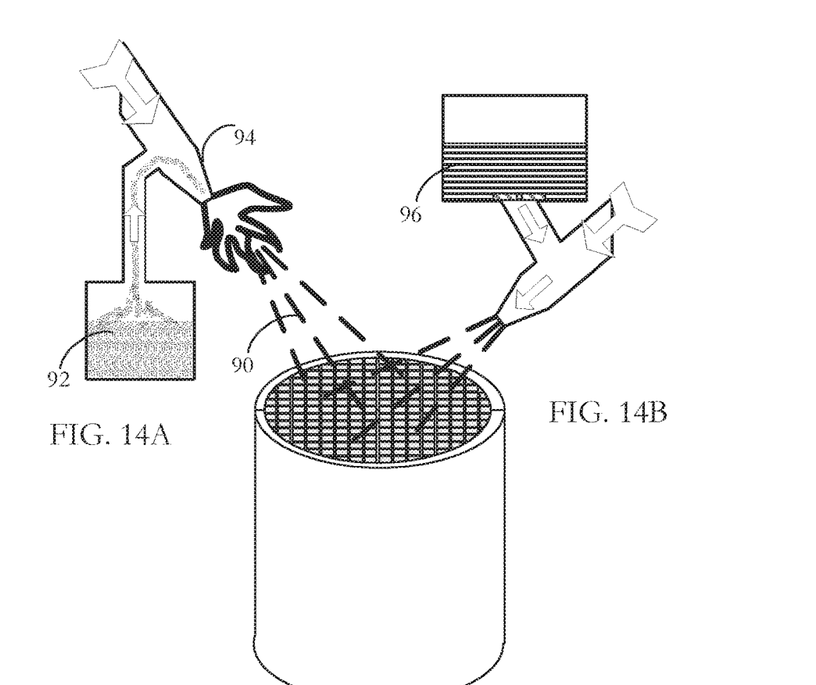
FIG. 14A is a detail view of part of apparatus being used in a method for generating atomized metal from metal powder and for depositing the atomized metal on inside surfaces of cells of a ceramic substrate, the method according to an embodiment of the invention for use in making a component for a gaseous emissions treatment system.
FIG. 14B is a detail view of part of apparatus being used in a method for generating atomized metal from reservoir of molten metal and for depositing the atomized metal on inside surfaces of cells of a ceramic substrate, the method according to an embodiment of the invention for use in making a component for a gaseous emissions treatment system.

In another method as illustrated in FIG. 14A, atomized molten metal 90, such as a 400 series stainless steel, is deposited on walls of selected cells of a ceramic honeycomb 10 by plasma spraying. Metal powder 92 is blown from a spray gun 94 that forces the stream through a flame 96 to liquefy the metal particles which then solidify as they land on the surfaces of cells 12. The duration and placement of coverage varies the thickness and location of the metal coating. Heat retained in the atomized molten metal 90 is miniscule compared to the mass of the ceramic substrate 10. Consequently, molten atoms freeze almost instantly as they encounter the walls 14 of the substrate. Because of the large differential in thermal mass, metals with a higher melting temperature than the firing temperature of the ceramic substrate can be used because they do not raise the temperature of the ceramic to a critical point. Examples are 430 stainless steel (melting point 1425 degrees C.) and Kanthal™ (melting point 1500 degrees C.). Constant bombardment by the molten atoms locally increases the temperature so as to create a continuous film. In the process, the plasma sprayer 94 is moved relative to a stationary ceramic substrate 10 or the substrate 10 is moved relative to a stationary sprayer 94. Coating is based on line of sight, so only short ceramic substrates with large cell spans really lend themselves to plasma spraying unless an adjunct process is used. In one such process, flow of the plasma is assisted by establishing a partial vacuum at the opposite end of the substrate 10 from the nozzle plasma sprayer 94. As the molten spray is generated, the vacuum draws it down the channels of the ceramic substrate where it interacts with the surface of the channel. It is difficult to establish a uniform thickness coating because even with vacuum assist, the coating is generally thicker near the plasma spray gun than farther from it. In one embodiment, to render a layer more uniform in thickness, after vacuum-assisted spraying from one end a cell, the cell is vacuum-assist sprayed from the other end. In a variation shown in FIG. 14B, metal is metered from a bath of molten metal 96. In another modification, the spray system is mounted on a gimbals by means of which the substrate is radially tilted at progressively changing angles to take advantage of the effect of gravity. Thus, spraying straight up or straight down a cell causes molten particles to travel in a straight line until their momentum dissipates. Spraying on an angle augments the trajectory of the particle permitting more directionality in depositing the atomized metal on the cell walls.

Figure 15:
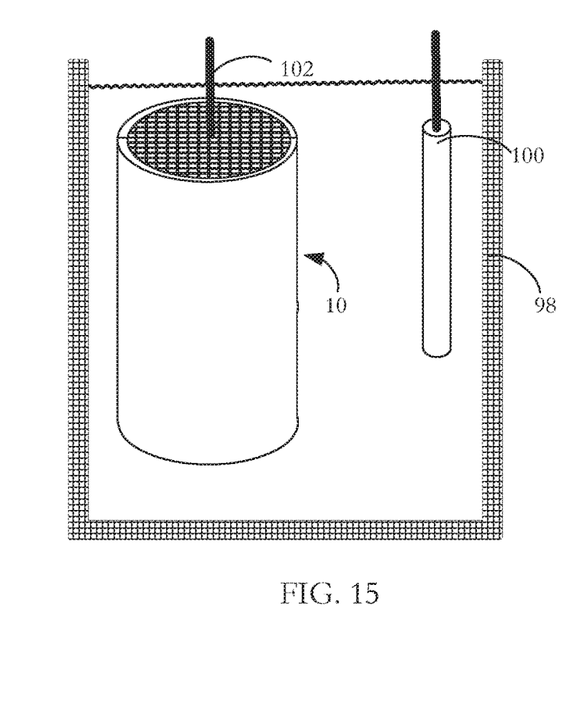
FIGS. 15 and 16 are detail views of part of apparatus being used in a method for depositing metal on inside surfaces of cells of a ceramic substrate by means of electrolysis, the method according to an embodiment of the invention for use in making a component for a gaseous emissions treatment system.
Figure 16:
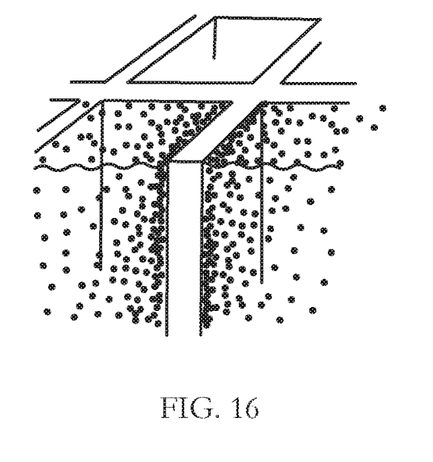

Referring to FIGS. 15 and 16, in another method of placing metal in a ceramic substrate, the metal is applied to selected surfaces on the walls 14 of a ceramic honeycomb 10 by electrodepositing. Because the ceramic substrate is not electrically conductive, wall surfaces are first made electrically conductive by immersing the ceramic substrate in a bath containing, for example, molten copper or nickel salts or a solution of such salts. The copper or nickel adheres to the ceramic in the presence of a catalyst, such as palladium chloride or tin chloride, thereby making the ceramic surface electrically conductive. Alternatively, the surface of the honeycomb is painted with metal paint. For specialist applications where high conductivity and corrosion resistance are required, more expensive materials such as any of gold, silver or palladium are deposited to provide the bonding layer. Once the initial metal layer is deposited or painted, the substrate is immersed in an electro-chemical bath 98 containing an electrolyte, such as a solution of common salts of copper, silver, chromium, nickel or iron. The ceramic substrate functions as an electrode for subsequent electrodeposition with the other electrode being a sacrificial electrode such as a rod 100 made of the metal to be deposited. A hanger wire attached in a cell of the substrate functions to spread charge to the entire substrate. In the case of stainless steel, an electrolyte solution containing Fe(II), Ni(II) and Cr(III) is made, plating being typically one metal at a time layer by layer to combine these three main components into a single composite layer. The number and duration of deposition baths in the process determines the thickness of electrodeposited metal. As previously indicated, in the case of stainless steel, several different metals are depositing at substantially the same time. Layering of different metals may be desirable for corrosion resistance of lesser metals similar to a chroming process. In one example, corrosion resistant chrome is an outer layer that coats and protects an iron layer having good magnetic permeability. In another example, the cells and the end faces of the substrate are coated but the outer surface is covered by a removable tape or wax to block deposition of the initial bonding layer so that no metal is plated on the outer surface in subsequent steps when depositing on the substrate end and interior. The ceramic substrate 10 has a complex geometry and therefore cannot readily be coated in a turbulent deposition bath generally used for simpler geometries. In normal circumstances, turbulence keeps the concentration of metal and salt uniform and replenishes the concentration of metal near the surface where the deposition reaction takes place as indicated in FIG. 16. This process does not work where channels are very small in cross sectional area and so do not permit through flow due to high friction. Consequently, only liquid that gets into the channels reacts, this reaction coming to an end once the metal is exhausted if it is not replenished. In one embodiment, a forced flow is used to circulate the electrolyte through the channels during plating with an anchoring arrangement being used to hold the substrate in place as the bath solution is pumped through the cells. This ensures that fresh, high metal concentration liquid is always flowing in close proximity to the surface of the channels.

As is known in the art, the electrolysis bath has two electrodes, one charged positively or negatively depending on the metal ions created and the other being of opposite charge. The ceramic substrate with its initial metal coating is charged with the opposite charge of the metal ion in order that the metal ion is attracted to the surface for deposition. A sacrificial electrode 102 oppositely charged to the ceramic metal coating attracts the non-metal ion. Metal in the electrolyte solution comes out of solution when an electrical differential is produced on the surface of the substrate. This differential breaks bonds within the solution allowing the metal portion of the molecule to become solid as it deposits on the metalized ceramic, the active zone for deposition being very close to the substrate surface. The electrolyte in the bath is constantly regenerated to return high concentration solution to the deposition zone. A very low viscosity solution is used in order that it readily flows through the narrow substrate channels, so allowing metal to be deposited on all surfaces of the ceramic. The number of dipping stages and the deposition time for coating govern the thickness of the metal coating. Once coated, the substrate is washed to remove any remaining unreacted electrolyte solution. The coated substrate must them be dried before catalyst washcoating. Although the exemplary metals mentioned previously are particularly suitable for electro-deposition, some non-metal conductors such as graphite can also be used and offer the advantages of an electrically conductive non-metal.

Steel, iron, copper, aluminum, among others, and their alloys are all suitable candidate metals for insertion into cells using one or more of the techniques described herein. These metals vary by magnetic permeability, melting temperature and other properties so that the choice of metal depends on the application parameters. For example, iron has relatively high magnetic permeability but little corrosion resistance while aluminum has relatively low magnetic permeability but good corrosion resistance. For use with cordierite ceramics particularly suitable for diesel applications, a metal with a lower melting temperature such as iron or copper may be suitable. For silicon carbide ceramics, a metal such as 430 stainless steel with a higher melting temperature is more suitable. 430 stainless steel, which has high magnetic permeability and corrosion resistance, is a preferred metal used in the metal wire placement method of U.S. patent application Ser. No. 14/452,800 mentioned previously, but is difficult to use with some of the metal placement techniques described above. For high temperature gasoline applications, cordierite substrates are often used. In these cases, copper and aluminum are preferred for processes requiring molten metal because the melting temperatures of iron and its alloys (such as stainless steels) generally exceed the cordierite firing temperature In most of the metal insertion techniques disclosed herein, a masking gasket is used to block the entrance of cells that are not selected so that they remain empty the masking gasket having openings at the entrance of cells into which metal is to be placed. In other techniques, cells can be injected individually with no masking gasket using a small injection tip at the end of a robotic arm for precise placement. The process is more time consuming but generally gentler on the delicate walls of the ceramic substrate.

In many of the metal insertion techniques disclosed herein, the metal must be heated to melting. This is typically done by one of oven (or furnace) heating, by inductive heating or by electric arc heating. Oven heating is the slowest of the heating processes because the relatively massive ceramic component is heated to the melting temperature of the metal. The metal used must have a melting point below the sintering temperature of both the ceramic and any catalyst washcoat previously applied to cell walls. Induction heating or electric arc heating are used where it is desired to focus heating at the metal and a part of the surrounding ceramic. Induction directly heats the metal until it melts in the cell. A high power induction supply on the order of 10s to 100s of kilowatts rapidly melts the small masses of metal within each substrate. In one implementation, the substrate is placed inside an induction coil that is itself contained within a gasket fixture so that placement and melting is effected in a combined process. Alternatively, induction heating is performed as a secondary process. Electric arcing passes high current at high voltage through the metal which melts owing to the resistive properties of the metal. The arc is produced by placing an electrode in close proximity to the metal to be melted so that the potential arcs from the electrode through the metal. One electrode is placed at the front face (possibly the front of a gasket layer) and one electrode is placed at the back face of the ceramic (bottom support) in a one-step process, or there could be many more electrodes in a secondary step. The ceramic is unaffected other than indirectly heating up due to the adjacent hot metal.

In the specification, the terms "cell" and "passage" are used interchangeably in relation to the described and claimed manufacturing processes although generally passages characterize catalytic converters and cells characterize particulate filters (PFs). In most catalytic converters, passages are through channels allowing for generally unimpeded flow of emissions gas past hot catalyst coating the passage walls. In particulate filters, a checkerboard subset of cells have their front ends plugged, a 'reverse' checkerboard subset of cells have their back ends plugged, and gaseous emissions are treated by being driven though porous walls of the honeycomb structure from cells of the first subset into cells of the reverse subset. However, some PFs also have catalyst coating the passage walls.

In this specification and claims, the terms "melting" and "softening" of metal are used interchangeably in relation to the described and claimed manufacturing processes. Heating to the melting point renders the particles into a fully molten mass. Melting to the softening point promotes surface melting or wetting but heating is not sufficient to fully melt the particles.

In this specification, the use of the terms "ceramic mix", "green ceramic", "clay" and similar materials and combinations thereof in relation to the extrusion of material as a precursor of a ceramic substrate for use in a gaseous emissions treatment component is intended to mean any material suitable for making such a substrate used in commercial processes for manufacturing the same.

What is claimed is:

1. A method of making a gaseous emissions treatment component, comprising extruding ceramic mix through a die to form an extrusion having a plurality of elongate cells extending along the extrusion, the cells bounded by walls dividing adjacent cells from one another, in concert with the extruding, operating a pull fixture to feed metal through the die with the extruded mix, the metal comprising metal wires fixed at a forward end to the pull fixture, the metal being pulled through the die while maintaining the wires in tension and in desired positions in the extrusion, and cutting off and firing a length of the extrusion and associated metal to form the component.

2. The method of claim 1, further comprising moving the wire through apertures in the die at the sites of at least some of the cells.

3. The method of claim 2, wherein the sizes of the apertures and the wires are related such that, when the wires are moved through respective ones of the apertures at said sites, the ceramic mix is prevented from exiting through the respective apertures.

4. The method of claim 1, further comprising entraining the metal wires in the walls of the extrusion as the ceramic mix is extruded through the die.

* * * * *